(12) United States Patent
Brewster

(10) Patent No.: US 11,440,604 B2
(45) Date of Patent: Sep. 13, 2022

(54) ADAPTER BRACKET FOR A MOTORCYCLE HEADLAMP

(71) Applicant: Randy Brewster, Painesville, OH (US)

(72) Inventor: Randy Brewster, Painesville, OH (US)

(*) Notice: Subject to any disclaimer, the term of this patent is extended or adjusted under 35 U.S.C. 154(b) by 0 days.

(21) Appl. No.: 17/517,586

(22) Filed: Nov. 2, 2021

(65) Prior Publication Data

US 2022/0135161 A1 May 5, 2022

Related U.S. Application Data

(60) Provisional application No. 63/108,559, filed on Nov. 2, 2020.

(51) Int. Cl.
*B62J 6/027* (2020.01)
*B62J 6/026* (2020.01)

(52) U.S. Cl.
CPC ............... *B62J 6/027* (2020.02); *B62J 6/026* (2020.02)

(58) Field of Classification Search
CPC ...... B60Q 1/0483; B60Q 1/0491; B62J 6/022; B62J 6/026; B62J 6/027; B62J 6/025; F21S 41/00; F21S 41/19
See application file for complete search history.

(56) References Cited

U.S. PATENT DOCUMENTS

| | | | |
|---|---|---|---|
| 5,758,958 A * | 6/1998 | Chen | F21V 17/14 362/307 |
| 7,249,875 B1 * | 7/2007 | Roach | B60Q 1/0005 362/369 |
| 2009/0231869 A1 * | 9/2009 | Osugi | B60Q 1/0683 362/475 |
| 2020/0290694 A1 * | 9/2020 | Yamasaki | B62J 6/025 |

FOREIGN PATENT DOCUMENTS

| | | | | |
|---|---|---|---|---|
| CN | 110160000 | * | 8/2019 | ............. F21S 41/00 |
| GB | 1876054 | * | 1/2008 | ............. B60Q 1/0433 |
| IN | WO 2018/215987 | * | 11/2018 | ............. B60R 11/00 |
| JP | H10-71980 | * | 3/1998 | ............. B62J 17/02 |

* cited by examiner

*Primary Examiner* — Zheng Song
(74) *Attorney, Agent, or Firm* — Carl A. Hjort, III

(57) ABSTRACT

An adapter bracket for a motorcycle headlamp is shown and described. The adapter bracket generally includes an annular ring having an open interior defined by an interior circumference, an exterior circumference, a top surface and a bottom surface, a plurality of indexing apertures disposed around the interior circumference, and a plurality of clamping tabs disposed around the exterior circumference. The adapter bracket further includes a plurality of ears attached to the annular ring, the ears having a slot for receiving a threaded anti-vibration bushing. The adapter bracket also includes a headlight aiming riser. A headlamp is disposed in the open interior of the annular ring and the annular ring is secured by the clamping tabs to a retaining ring and the annular ring, the headlamp, and the retaining ring are secured to a main bracket by fasteners that engage with the threaded anti-vibration bushings.

20 Claims, 6 Drawing Sheets

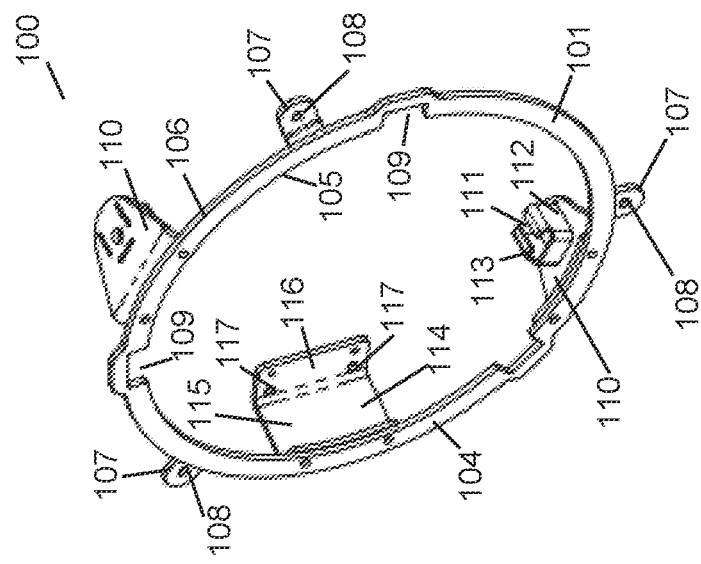
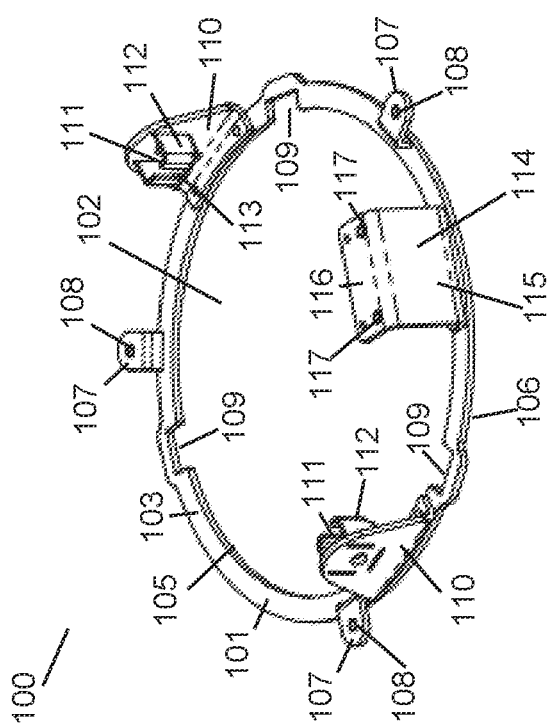

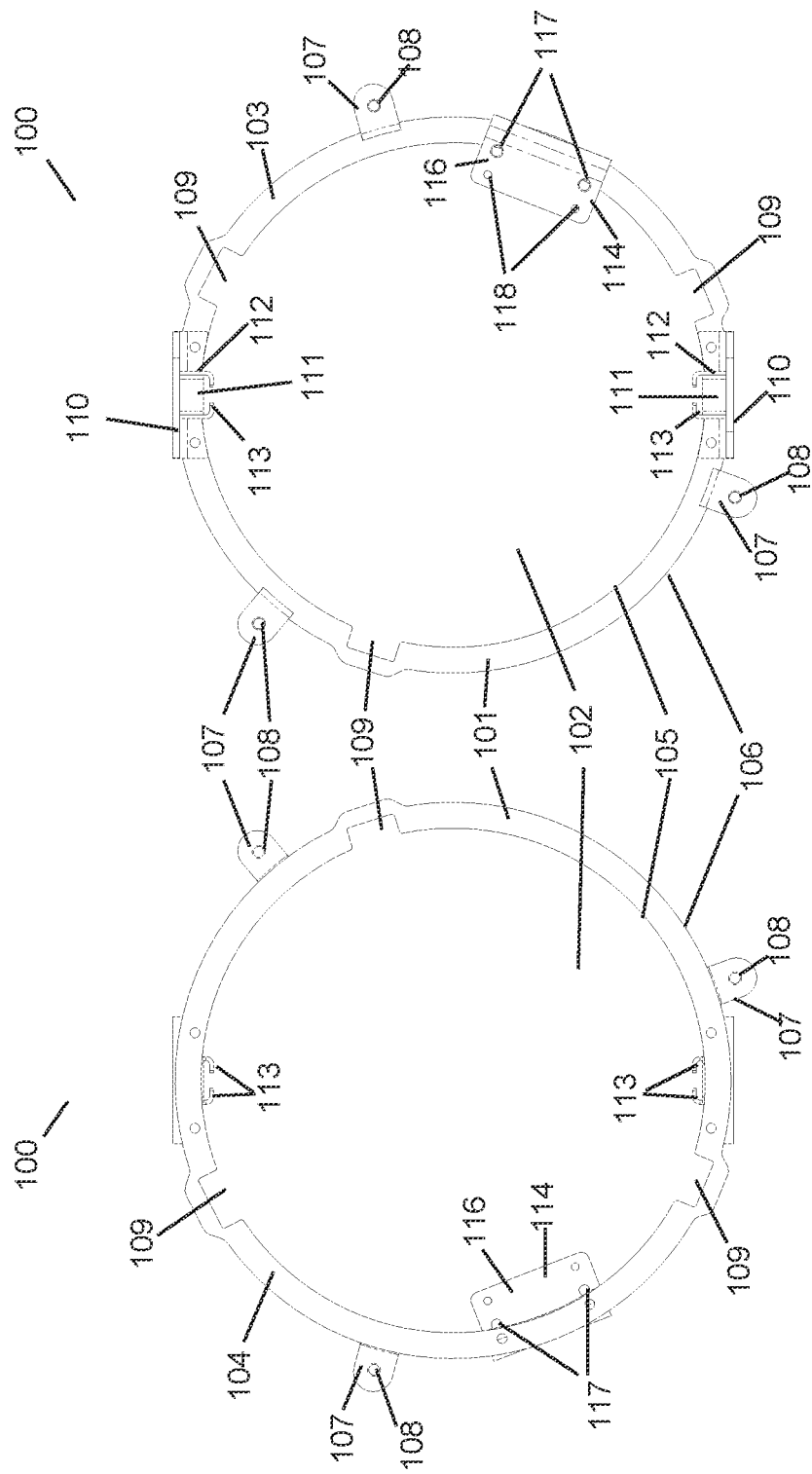

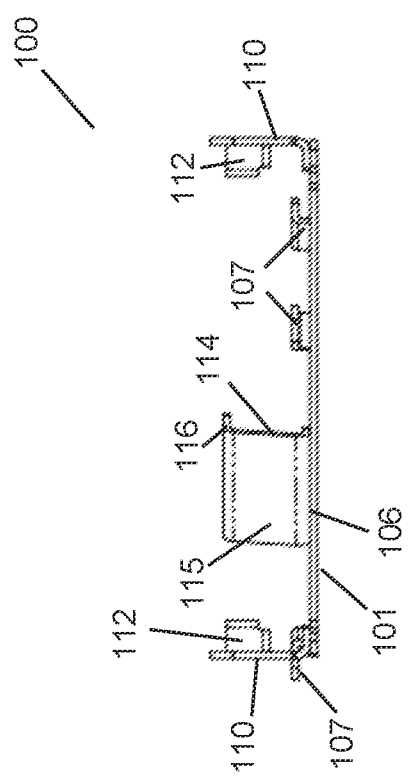
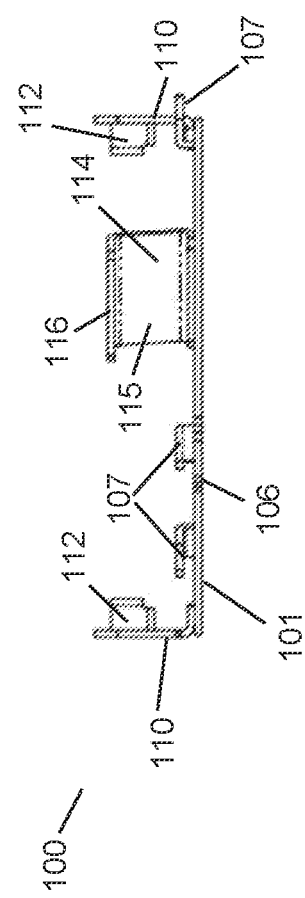

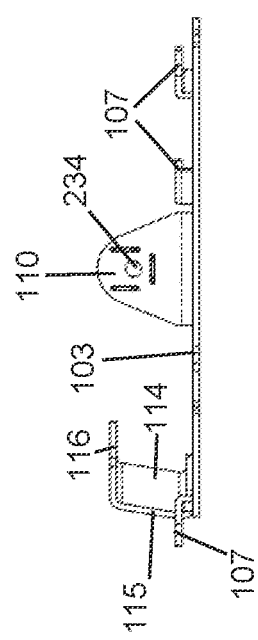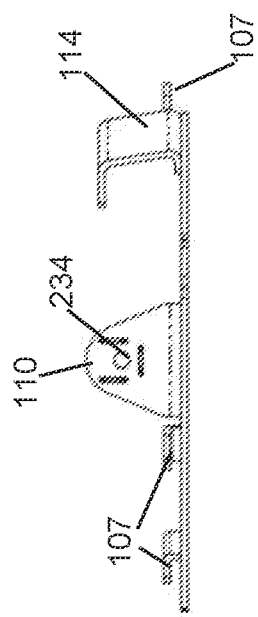

ABSTRACT BRACKET FOR A MOTORCYCLE
HEADLAMP

CROSS REFERENCE TO RELATED
APPLICATIONS

The present application claims the benefits of U.S. Provisional Application Ser. No. 63/108,559, filed Nov. 2, 2020, entitled "Adapter Bracket for a Motorcycle Headlamp" and which is incorporated herein by this reference in its entirety.

BRIEF DESCRIPTION OF THE DRAWINGS

FIG. 1a is a top perspective view of an adapter bracket for a motorcycle headlamp.

FIG. 1b is a bottom perspective view of the adapter bracket for a motorcycle headlamp.

FIG. 1c is a top view of the adapter bracket for a motorcycle headlamp.

FIG. 1d is a bottom view of the adapter bracket for a motorcycle headlamp.

FIG. 1e is a left side view of the adapter bracket for a motorcycle headlamp.

FIG. 1f is a right side view of the adapter bracket for a motorcycle headlamp.

FIG. 1g is a front view of the adapter bracket for a motorcycle headlamp.

FIG. 1h is a rear view of the adapter bracket for a motorcycle headlamp.

DETAILED DESCRIPTION OF THE DRAWINGS

Figure 2:
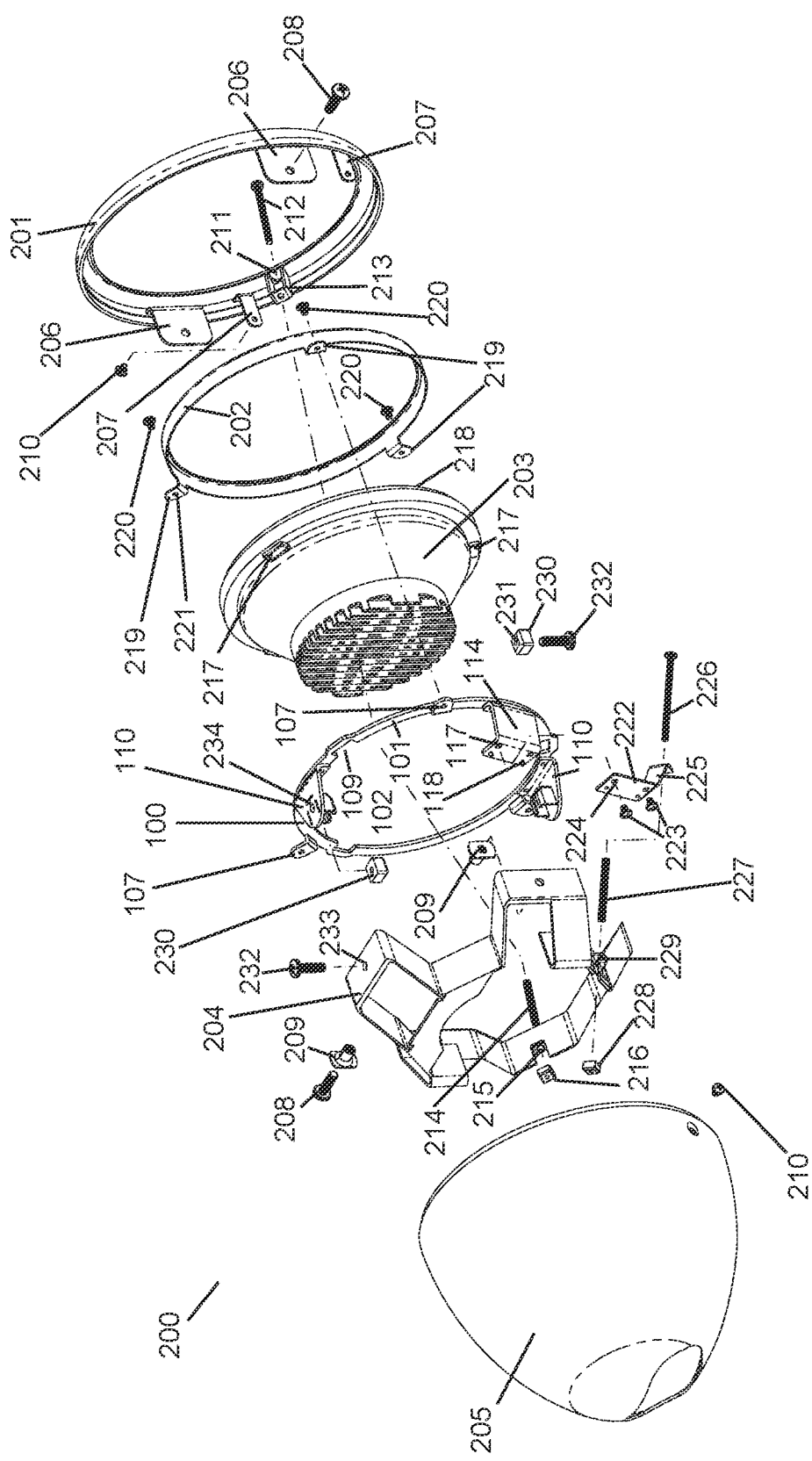
FIG. 2 is an exploded view of the adapter bracket for a motorcycle headlamp engaged with other parts in the motorcycle headlamp assembly.

Embodiments of an adapter bracket for a motorcycle headlamp are shown and described. The adapter bracket generally includes an annular ring having an open interior defined by an interior circumference, an exterior circumference, a top surface and a bottom surface, a plurality of indexing apertures disposed around the interior circumference, and a plurality of clamping tabs disposed around the exterior circumference. The adapter bracket further includes a plurality of ears depending upwardly from the top surface of the annular ring, said ears having a hole therethrough and a slot for receiving a threaded anti-vibration bushing and a headlight aiming riser depending upwardly from the top surface of the annular ring. The headlamp is disposed in the open interior of the annular ring and the annular ring is secured by the clamping tabs to a retaining ring and the annular ring, the headlamp, and the retaining ring are secured to a main bracket by fasteners that engage with the threaded anti-vibration bushings.

FIGS. 1a-h show various views of the adapter bracket for a motorcycle headlamp 100. Like numerals will be used to identify elements common to all FIGS. 1a-h. Thus, as can be seen most clearly in FIGS. 1c-d, the adapter bracket for a motorcycle headlamp comprises an annular ring 101, with an open interior 102, a top surface 103 and a bottom surface 104. The open interior 102 is defined by an interior circumference 105 of the annular ring 101. Additionally, the annular ring 101 has an exterior circumference 106. Disposed about the exterior circumference 106 are a plurality of clamping tabs 107. In the embodiment shown in FIGS. 1a-h, three clamping tabs 107 are shown, but it should be appreciated that more or less than three clamping tabs 107 may be provided as the application requires. It should be further appreciated that the clamping tabs 107 may be formed integral to the annular ring 101, or they may be formed separately and attached to the annular ring 101 by means of fasteners or welding or any other way of attachment known in the art. Each of the clamping tabs 107 has a hole 108 through the center of the clamping tab 107. As will be discussed in greater detail below, the hole 108 accepts a fastener for clamping the annular ring 101 to a retaining ring.

Disposed about the interior circumference 105 of the annular ring 101 are a plurality of indexing apertures 109. In the embodiment shown in FIGS. 1a-h, three indexing apertures 109 are shown, but it should be appreciated that more or less than three indexing apertures 109 may be provided as the application requires. As will be discussed in greater detail below, the indexing apertures 109 receive corresponding features on a headlamp to retain the headlamp in a specified orientation in the annular ring.

As can be seen most clearly in FIG. 1a, the adapter bracket for a motorcycle headlamp 100 also includes two ears 110. The ears 110 depend upwardly from the top surface 103 of the annular ring 101. It should appreciated that while two ears 110 are shown in the embodiment shown in FIGS. 1a-h, a greater or lesser number of ears 110 may be used as the application requires. It should be further appreciated that the ears 110 may be formed integral to the annular ring 101, or they may be formed separately and attached to the annular ring 101 by means of fasteners or welding or any other way of attachment known in the art. Each of the ears 110 has a slot 111 on the side of the ear oriented toward the open interior 102 of the annular ring 101. As can be seen in FIG. 1b, the slot may be a generally U-shaped body 112, with protruding tabs 113. As will be discussed in greater detail below, the slots 111 receive and capture an anti-vibration bushing when the adapter bracket for a motorcycle headlamp 100 is assembled with other components in the overall headlamp assembly. It should be appreciated that the slots 111 may be formed integral to the ears 110, or they may be formed separately and attached to the ears 110 by means of fasteners or welding or any other way of attachment known in the art.

As can be further seen in FIG. 1a, the adapter bracket for a motorcycle headlamp 100 may be provided with a headlamp aiming riser 114. The headlamp aiming riser 114 depends upwardly from the top surface 103 of the annular ring 101. The headlamp aiming riser 114 includes a vertical riser portion 115 and a horizontal connection portion 116. The horizontal connection portion 116 may include holes 117 for connecting a secondary headlight aiming mechanism (discussed below) to the headlight aiming riser 114. Additionally, the headlight aiming riser 114 may be provided with locating posts 118, which mate with holes in the headlight aiming mechanism and aid in the retention of the headlight aiming mechanism in a desired orientation. It should be appreciated that the headlight aiming riser 114 may be formed integral to the annular ring 101, or it may be formed separately and attached to the annular ring 101 by means of fasteners or welding or any other way of attachment known in the art.

The constituent parts of the adapter bracket 100, i.e. the annular ring 101, the clamping tabs 107, the ears 110 with slot 111 and the headlamp aiming riser 114 may be made all of the same material, or the constituent parts may be formed from different materials and joined together. By way of example, and without limitation, the adapter bracket may formed from ferrous metals, nonferrous metals or plastics. Further, as discussed above, the constituent parts of the adapter bracket may be made as one contiguous part, or they may be made as separate parts and then joined together. By way of example, and without limitation, the adapter bracket may be manufactured by stamping, progressive stamping, milling, CNC machining, additive manufacturing, waterjetting, plasma cutting, or laser cutting.

Figure 3:
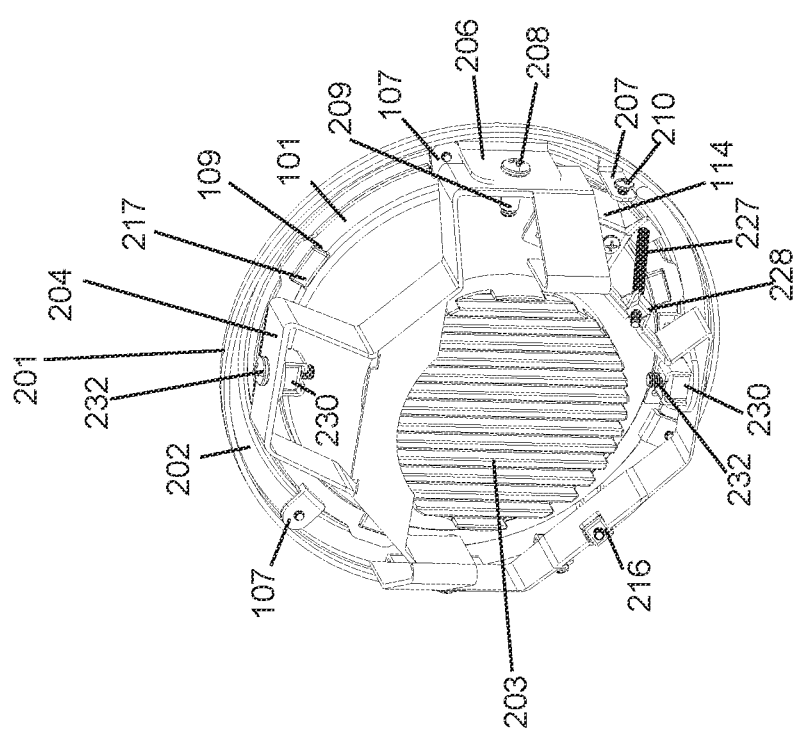
FIG. 3 is a partially assembled view of the adapter bracket for a motorcycle headlamp engaged with other parts in the motorcycle headlamp assembly.

Turning now to the exploded and partially assembled views of FIGS. 2 and 3, respectively, these figures show how the adapter bracket for a motorcycle headlamp 100 is assembled with other components in the overall headlamp assembly. FIG. 2 shows the overall headlamp assembly 200, in an exploded view. The overall headlamp assembly 200 has a bezel 201, a retaining ring 202, a headlamp 203, the adapter bracket 100, a main bracket 204 and a housing 205.

Turning first to the bezel 201, it can be seen that the bezel 201 has two large tabs 206 and two small tabs 207. The large tabs 206 secure the bezel 201 to the main bracket 204 by fasteners 208 and nuts 209. The small tabs 207 secure the entire assembly of the bezel 201, the retaining ring 202, the headlamp 203, the adapter bracket 100 and the main bracket 204 to the housing 205 by fasteners 210. The bezel 201 may also be provided with an engagement feature (not shown) and the housing 205 may be provided with a complimentary engagement feature (also not shown) to increase the durability of the mechanical connection between the bezel 201 and the housing 205.

The bezel 201 is also provided with a hole communicating with a recess 211, a primary aiming screw 212 and a primary aiming screw retainer 213. As can be seen in the exploded view of FIG. 2, the primary aiming screw 212 passes into the recess 211 and sits in the primary aiming screw retainer 213. The primary aiming screw 212 then passes through spring 214 and through a hole 215 in main bracket 204 and finally engages with a nut 216. The spring 214 provides a bias pushing the main bracket 204 and bezel 201 apart, and by adjusting the primary aiming screw 212, a user may adjust this biasing force to at least partially aim the headlamp assembly when it is mounted on a motorcycle.

The headlamp 203 is clamped between the retaining ring 202 and the adapter bracket 100. In one embodiment, the headlamp 203 may be an LED headlamp. It should be appreciated that any suitable headlamp, whether using LEDs or other lighting technology falls within the scope of this disclosure. As can be seen in FIG. 2, the headlamp 203 is located in the open interior 102 of the adapter bracket 100. The headlamp 203 may be provided with indexing features 217, which engage with the indexing apertures 109 on the interior circumference 105 of the annular ring 101. The retaining ring mates with a front edge 218 of the headlamp 203. Tabs 219 on the retaining ring 202 are used to secure the retaining ring to the adapter bracket 100. Fasteners 220 pass through holes 221 on the tabs 219 and thread into holes 108 on the clamping tabs 107 of the adapter bracket 100.

The headlamp assembly 200 is also provided with a secondary aiming mechanism attached to the headlamp aiming riser 114 on the adapter bracket for a motorcycle headlamp 100. The secondary aiming mechanism may consist of a secondary aiming bracket 222, secured by fasteners 223 to holes 117 on the headlight aiming riser 114. Additionally, the headlight aiming riser 114 may be provided with locating posts 118, which mate with holes 224 on the secondary aiming bracket 222 and aid in the retention of the secondary aiming bracket in a desired orientation. The secondary aiming bracket 222 has a tab 225 with a hole (not visible) through which secondary aiming screw 226 passes. The secondary aiming screw 226 then passes through secondary aiming spring 227 and into the nut 228 retained in feature 229 on the main bracket 204. The spring 227 provides a bias pushing the main bracket 204 and the adapter bracket 100 apart, and by adjusting the secondary aiming screw 226, a user may adjust this biasing force to at least partially aim the headlamp assembly when it is mounted on a motorcycle.

The adapter bracket 100 is also connected to the main bracket 204. The adapter bracket 100 may be provided with anti-vibration bushings 230 which are received in and captured by the slots 111 on the ears 110 of the adapter bracket 100. In such an arrangements, the anti-vibration bushings 230 are both retained in the slots 111 and prevented from rotating, such that a screw may be threaded into them. In one embodiment, the anti-vibration bushings 230 may be square-shaped nylon bushings having a threaded axial bore 231. The adapter bracket 100 is connected to the main bracket 204 by screws 232 that pass through hole 233 in the main bracket 204, into hole 234 in the ear 110, and into the threaded axial bore 231 of the anti-vibration bushing 230.

It will be appreciated by those of ordinary skill in the art that, while the forgoing disclosure has been set forth in connection with particular embodiments and examples, the disclosure is not intended to be necessarily so limited, and that numerous other embodiments, examples, uses, modifications and departures from the embodiments, examples and uses described herein are intended to be encompassed by the claims attached hereto. Various features of the disclosure are set forth in the following claims.

I claim:

1. A universal adapter bracket for a motorcycle headlamp comprising:
   an annular ring having an open interior defined by an interior circumference, said annular ring also having an exterior circumference, a top surface and a bottom surface,
   wherein a plurality of indexing apertures are disposed around the interior circumference of the annular ring,
   wherein a plurality of clamping tabs are disposed around the exterior circumference of the annular ring, each of said clamping tabs having a hole therethrough;
   at least two ears depending upwardly from the top surface of the annular ring, said ears having a hole therethrough and a slot for receiving and capturing a threaded anti-vibration bushing;
   a headlight aiming riser depending upwardly from the top surface of the annular ring, said headlight aiming riser provided with a plurality of holes to secure a headlight aiming apparatus to the headlight aiming riser;
   wherein a headlamp is disposed in the open interior of the annular ring and the annular ring is secured to a retaining ring by first fasteners passing through the retaining ring and into the holes in the clamping tabs on the annular ring;
   and wherein the annular ring, the headlamp, and the retaining ring are secured to a main bracket by second fasteners that extend through the main bracket, into the holes in the ears, wherein said second fasteners are in threaded engagement with the threaded anti-vibration bushing.

2. The universal adapter bracket for a motorcycle headlamp of claim 1, further comprising a bezel covering the retaining ring and attached to the main bracket.

3. The universal adapter bracket for a motorcycle headlamp of claim 2, wherein the annular ring, the headlamp, the retaining ring and the main bracket are disposed within a housing and the bezel mates with the housing.

4. The universal adapter bracket for a motorcycle headlamp of claim 2, wherein the bezel has a recess for receiving a primary aiming screw, said primary aiming screw disposed within a coil of a primary aiming spring and engaged with a nut on the main bracket, wherein rotation of the primary aiming screw allows for the aiming of the headlamp.

5. The universal adapter bracket for a motorcycle headlamp of claim 1, wherein the anti-vibration bushings are square-shaped nylon bushings having a threaded axial bore.

6. The universal adapter bracket for a motorcycle headlamp of claim 1, wherein the headlamp is an LED headlamp.

7. The universal adapter bracket for a motorcycle headlamp of claim 1, wherein the headlight aiming apparatus provides a hole for receiving a secondary aiming screw, said secondary aiming screw disposed within a coil of a secondary aiming spring and engaged with a nut on the main bracket, wherein rotation of the secondary aiming screw allows for the aiming of the headlamp.

8. The universal adapter bracket for a motorcycle headlamp of claim 1, wherein the headlight aiming riser is provided with a plurality of locating posts, which engage with holes on the headlight aiming apparatus.

9. The universal adapter bracket for a motorcycle headlamp of claim 1, wherein the universal adapter bracket is formed from a material selected from the group comprising ferrous metals, nonferrous metals and plastics.

10. The universal adapter bracket for a motorcycle headlamp of claim 1, wherein the universal adapter bracket is manufactured by at least one of the following processes: stamping, progressive stamping, milling, CNC machining, additive manufacturing, water-jetting, plasma cutting, and laser cutting.

11. An adapter bracket for a headlamp comprising:
an annular ring having an open interior defined by an interior circumference, an exterior circumference, a top surface and a bottom surface, a plurality of indexing apertures disposed around the interior circumference, and a plurality of clamping tabs disposed around the exterior circumference;
a plurality of ears depending upwardly from the top surface of the annular ring, said ears having a hole therethrough and a slot for receiving a threaded anti-vibration bushing;
a headlight aiming riser depending upwardly from the top surface of the annular ring;
wherein the headlamp is disposed in the open interior of the annular ring and the annular ring is secured by the clamping tabs to a retaining ring;
and wherein the annular ring, the headlamp, and the retaining ring are secured to a main bracket by fasteners that engage with the threaded anti-vibration bushings.

12. The adapter bracket for a headlamp of claim 11, further comprising a bezel covering the retaining ring and attached to the main bracket.

13. The adapter bracket for a headlamp of claim 12, wherein the annular ring, the headlamp, the retaining ring and the main bracket are disposed within a housing and the bezel mates with the housing.

14. The adapter bracket for a headlamp of claim 12, wherein the bezel has a recess for receiving a primary aiming screw, said primary aiming screw disposed within a coil of a primary aiming spring and engaged with a nut on the main bracket, wherein rotation of the primary aiming screw allows for the aiming of the headlamp.

15. The adapter bracket for a headlamp of claim 11, wherein the anti-vibration bushings are square-shaped nylon bushings having a threaded axial bore.

16. The adapter bracket for a headlamp of claim 11, wherein the headlamp is an LED headlamp.

17. The adapter bracket for a headlamp of claim 11, wherein the headlight aiming apparatus provides a hole for receiving a secondary aiming screw, said secondary aiming screw disposed within a coil of a secondary aiming spring and engaged with a nut on the main bracket, wherein rotation of the secondary aiming screw allows for the aiming of the headlamp.

18. The adapter bracket for a headlamp of claim 11, wherein the headlight aiming riser is provided with a plurality of locating posts, which engage with holes on the headlight aiming apparatus.

19. The adapter bracket for a headlamp of claim 11, wherein the adapter bracket is formed from a material selected from the group comprising ferrous metals, nonferrous metals and plastics.

20. The adapter bracket for a headlamp of claim 11, wherein the adapter bracket is manufactured by at least one of the following processes: stamping, progressive stamping, milling, CNC machining, additive manufacturing, water-jetting, plasma cutting, and laser cutting.

* * * * *